US012214381B1

(12) United States Patent
Patil et al.

(10) Patent No.: US 12,214,381 B1
(45) Date of Patent: Feb. 4, 2025

(54) PORTABLE PARTICULATE GRADER

(71) Applicant: SAUDI ARABIAN OIL COMPANY, Dhahran (SA)

(72) Inventors: Pravinkumar Patil, Udhailiyah (SA); Jamal H. Khalaifa, Al Mubarraz (SA); Mohammad Almusaiteer, Udhailiyah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/525,541

(22) Filed: Nov. 30, 2023

(51) Int. Cl.
*B07B 1/00* (2006.01)
*B07B 1/28* (2006.01)

(52) U.S. Cl.
CPC ................ *B07B 1/005* (2013.01); *B07B 1/28* (2013.01)

(58) Field of Classification Search
CPC .. B07B 1/005; B07B 1/28; B07B 1/30; B07B 1/02
USPC ........................................................ 209/346
See application file for complete search history.

(56) References Cited

U.S. PATENT DOCUMENTS

| | | | | |
|---|---|---|---|---|
| 1,161,211 | A * | 11/1915 | Harris | B07B 1/005 209/345 |
| 1,594,854 | A * | 8/1926 | Savage | B07B 1/286 209/346 |
| 3,179,251 | A | 4/1965 | Nickel | |
| 5,213,216 | A | 5/1993 | Suehiro et al. | |
| 10,363,577 | B2 | 7/2019 | Wojciechowski et al. | |
| 2007/0158244 | A1* | 7/2007 | Puda | B07B 1/005 209/309 |
| 2019/0337018 | A1 | 11/2019 | Tatsumoto et al. | |

OTHER PUBLICATIONS

JX Filtration (China) Co., Ltd., "Stainless Steel Rotary Vibrating Sieve Sifter Machine"; <https://shop.filtrationchina.com/products/stainless-steel-rotary-vibrating-sieve?variant=39891978944586&gclid=EAIaIQobChMI-aCesc-egAMVJodaBR0s9wsTEAQYBSABEgJCwPD_BwE>; Accessed Nov. 30, 2023 (38 pages).

W. W. Grainger, Inc., "Cleveland Vibrator Co. VibratoryPortable Screener"; <https://www.grainger.com/product/21TZ18?gucid=N:N:PS:Paid:GGL:CSM-2295:4P7A1P:20501231&gclid=EAIaIQobChMIq6GT_s6egAMVs4VaBROSUgFVEAQYByABEglew_D_BwE&gclsrc=aw.ds>; Accessed Nov. 30, 2023 (2 pages).

HK Technologies, "HK Quik Siv Hand Sieve—Lab & Pilot Sieves"; <https://www.hksieve.com/products/lab-pilot-sieves-products/hk-quik-siv-hand-sieve/>; Accessed Nov. 30, 2023 (6 pages).

* cited by examiner

*Primary Examiner* — Michael McCullough
*Assistant Examiner* — Jessica L Burkman
(74) *Attorney, Agent, or Firm* — Osha Bergman Watanabe & Burton LLP

(57) ABSTRACT

A portable particulate grader includes a grader body assembly and a grader tray assembly. The grader body assembly includes an upper housing including side portions, a plurality of springs, a lower chute, a dust control gate, and wheels. The springs are disposed on an inner portion of the upper housing, and hold a grader tray assembly in an angle and provide vibrations to the grader tray assembly. The grader tray assembly includes a grader tray frame, a detachable mesh disposed on the grader tray frame, an upper chute, and a residual control gate. A method for grading particulates includes introducing the input material to the detachable mesh, providing vibrations non-electrically to the grader to separate the input material into a filtered material and a residual material, opening the dust control gate to retrieve the filtered material, and opening the residual control gate to transfer the residual material.

16 Claims, 4 Drawing Sheets

PORTABLE PARTICULATE GRADER

BACKGROUND

Grading or sifting of particulates or powder materials is often conducted in order to separate the particles based on their sizes for various purposes, such as improvement of product quality and elimination of particles with certain sizes. Grading of particulates generally results in airborne particulates due to the agitation of the particulates caused during the grading. Such airborne particulates are often considered as a health hazard or environmental hazard, and minimization of airborne particulates is generally desired or required.

Industrial sieves or sifters available in the art are often not fully enclosed, which allows the sifted particulate to be airborne and poses health and safety risks due to airborne particulates. Furthermore, the industrial sieves or sifters are generally operated electrically, and may produce electric sparks which act as an ignition source to cause fire or explosion in an environment where fuel and air are present, additionally posing safety risks. In addition, many of the industrial sieves/sifters are not portable and cannot be readily transported. Accordingly, there exists a need for the development of a grader that is portable and that addresses the above health and safety concerns.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a portable particulate grader including a grader body assembly and a grader tray assembly. The grader body assembly includes an upper housing including side portions, a plurality of springs, a lower chute, a dust control gate, and wheels. The plurality of springs is disposed on an inner portion of the upper housing, and is configured to hold a grader tray assembly in a descending angle toward a first side in a range of from 5 to 45 degrees, and provide vibrations to the grader tray assembly. The lower chute includes a bottom portion and side portions, and is located immediately below the upper housing. The dust control gate is provided on a second side of the side portions of the lower chute. The wheels are disposed on the grader body assembly.

The grader tray assembly includes a grader tray frame, a detachable mesh disposed on the grader tray frame to filter an input material, an upper chute located on a first side of the grader tray assembly, and a residual control gate located between the detachable mesh and the upper chute.

The grader tray assembly is configured to be detachable from the grader body assembly. The upper housing, the lower chute and the grader tray assembly are configured to provide an enclosed space to prevent emission of a filtered material. The portable particulate grader does not include an electrically-operated component.

In another aspect, embodiments disclosed herein relate a method for grading particulates. The method includes introducing an input material to a detachable mesh of a portable particulate grader, and providing vibrations non-electrically to the portable particulate grader to separate the input material into a filtered material and a residual material. The provided vibrations transfer the filtered material into a lower chute and transfer the residual material toward the first side of the grader tray assembly. The method further includes opening the dust control gate to retrieve the filtered material from the lower chute, and opening the residual control gate to transfer the residual material to the upper chute.

Other aspects and advantages of the claimed subject matter will be apparent from the following description and the appended claims.

DETAILED DESCRIPTION

Portable Particulate Grader

Figure 1A:
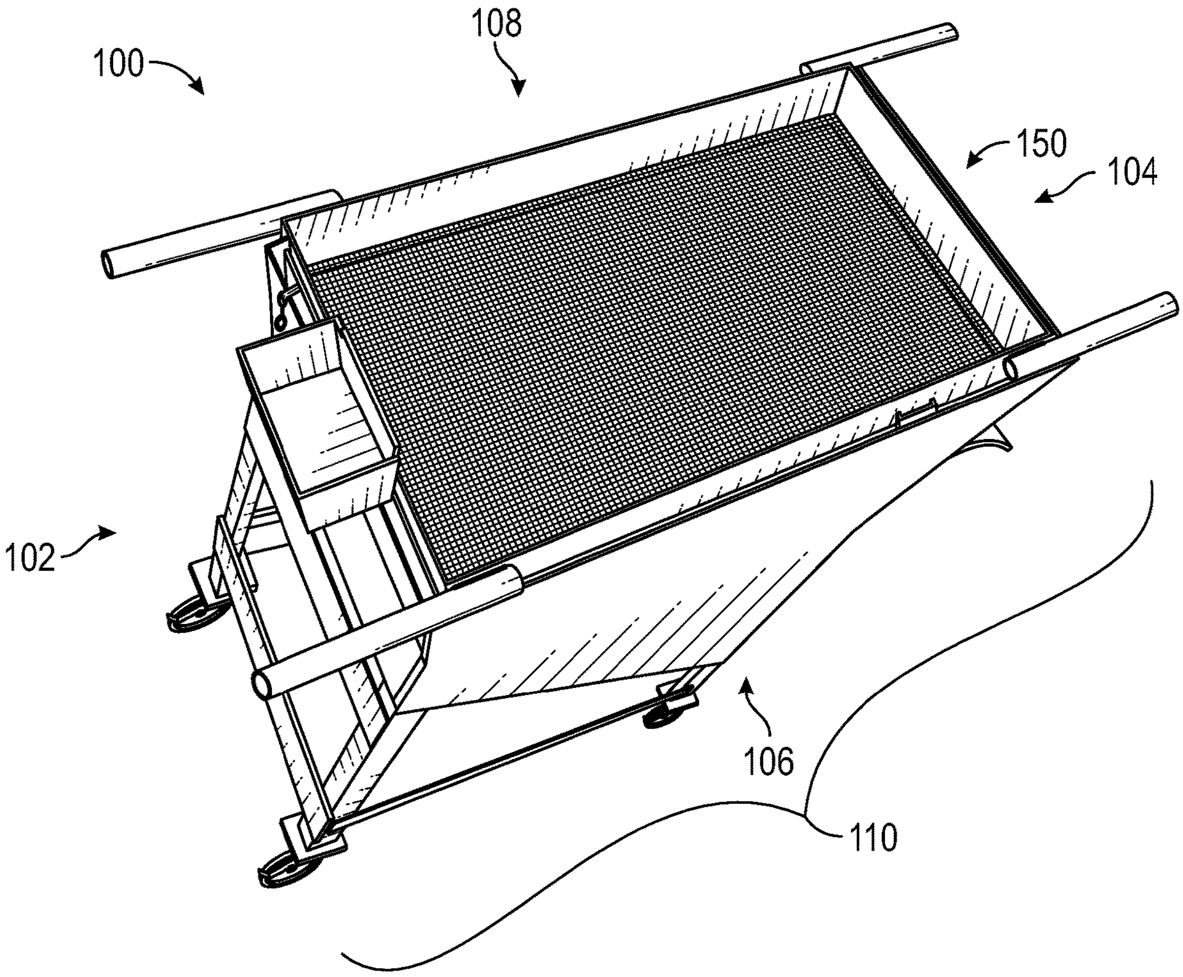
FIG. 1A is a perspective view of the portable particulate grader according to one or more embodiments.

In one aspect, embodiments disclosed herein relate to a portable particulate grader. FIG. 1A is a perspective view of the portable particulate grader according to one or more embodiments. The portable particulate grader ("grader") 100 includes a grader body assembly ("body assembly") 110 and a grader tray assembly ("tray assembly") 150. The grader 100 has a first side 102, a second side 104, a third side 106 and a fourth side 108. In the present disclosure, the first side 102 refers to the side of the grader 100 where residual material is retrieved. The second side 104 is the opposite side of the first side 102 and is the side of the grader 100 where the filtered material is retrieved. The third side 106 is the right side of the grader 100 when the grader 100 is viewed from the first side 102. The fourth side 108 is the opposite side of the third side 106 and the left side of the grader 100 when the grader 100 is viewed from the first side 102.

In the present disclosure, "a first side 102" of the tray assembly 150 and "a first side 102" of the body assembly 110 refer to the same side as "a first side 102" of the grader 100 when the tray assembly 150 is placed on the body assembly 110 as intended to be placed. In other words, the first side 102 of the tray assembly 150, body assembly 110, the grader 100 refer to the same side when the tray assembly 150 is placed on the body assembly 110 to have an upper chute 156 (which is described in detail in the subsequent sections) lower than the side without the upper chute 156. The same definition applies to the second side 104, third side 106 and fourth side 108 of the tray assembly 150, body assembly 110 and grader 100.

"Toward a first side 102" and "toward a second side 104" are interpreted to be "in the direction of" the first side 102/second side 104, respectively. For example, "hold a grader tray assembly in a descending angle toward a first side" means that the grader tray assembly is held to have the first side of the grader tray assembly lower than second side of the grader tray assembly such that the grader tray assembly has a descending slope when viewed from the second side in the direction of the first side.

Figure 1B:
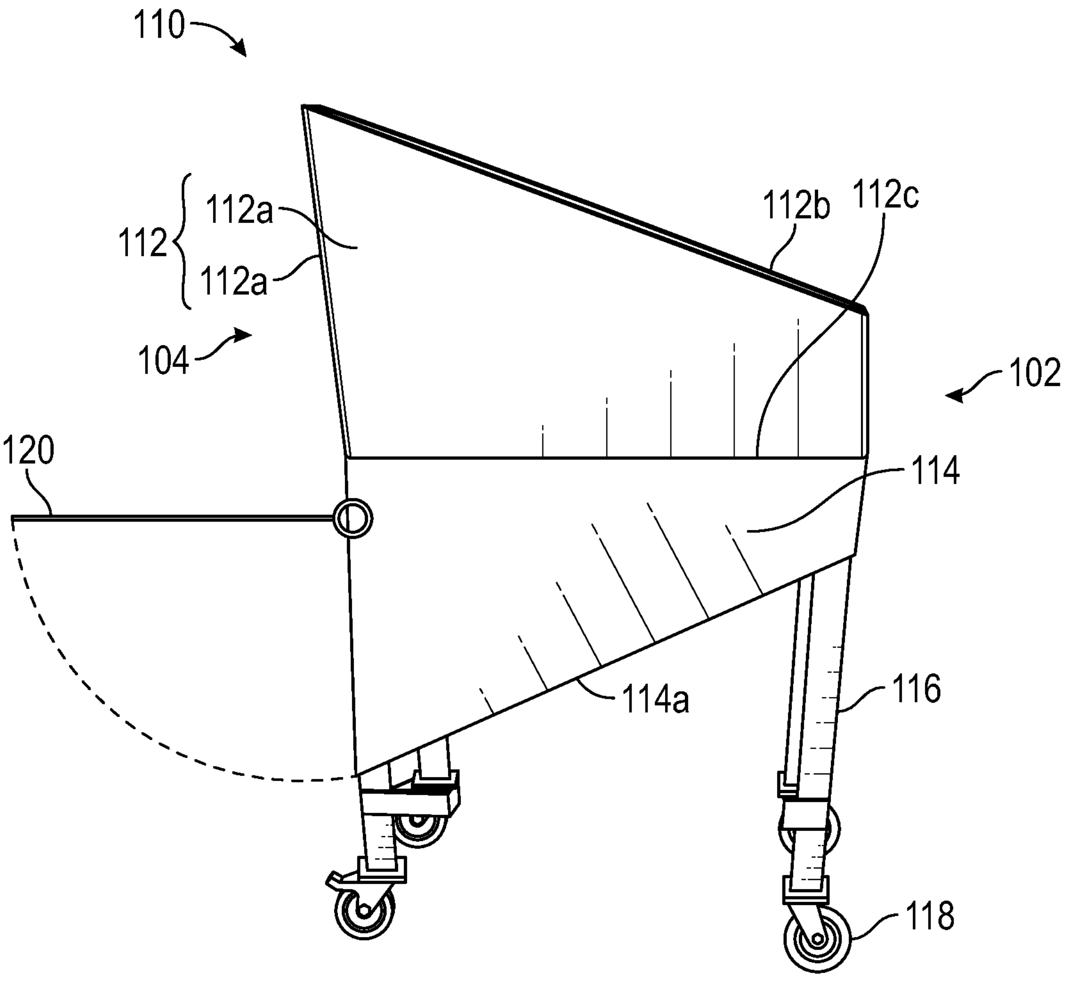
FIG. 1B is a side view of the portable particulate grader according to one or more embodiments.
Figure 1C:
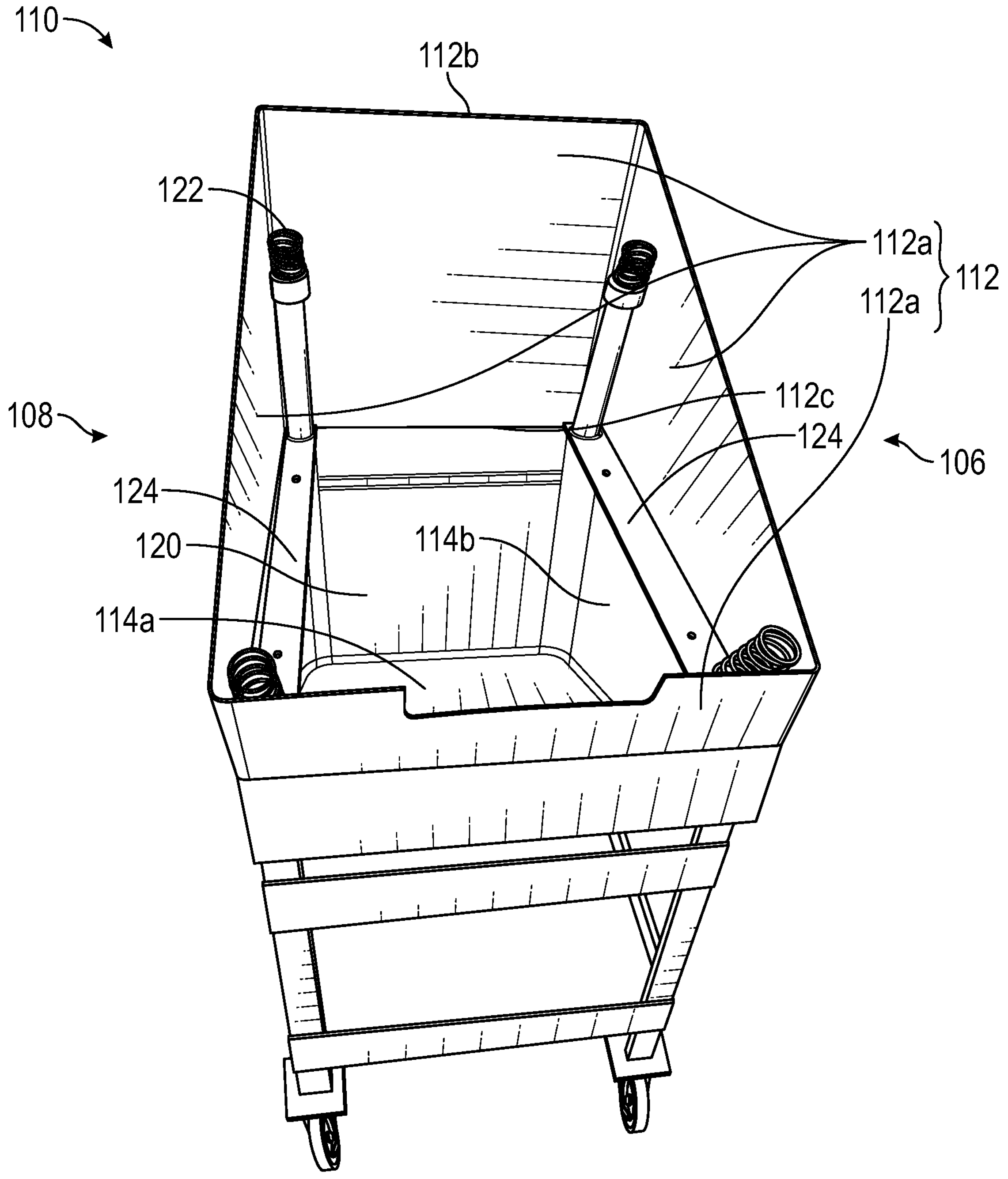
FIG. 1C is a perspective view of the portable particulate grader according to one or more embodiments.

FIGS. 1B-C are side and perspective views of the body assembly 110 included in the grader 100. The body assembly 110 includes an upper housing 112 including side portions 112*a* having an upper edge 112*b* and a lower edge 112*c*. The body assembly 110 includes a plurality of springs 122 disposed on an inner portion of the upper housing 112. The "inner portion of the upper housing 112" refers to a space within the side portions 112*a*, a plane defined by the upper edge 112*b* and a plane defined by the lower edge 112*c* of the side portions 112*a* of the upper housing 112. The body assembly 110 also includes a lower chute 114 including a bottom portion 114*a* and side portions 114*b*, wheels 118 disposed on the body assembly 110, and a dust control gate 120 provided on the second side 104 of the body assembly 110. The wheels 118 may be disposed on a plurality of support 116 that is disposed on the body assembly 110.

Figure 1D:
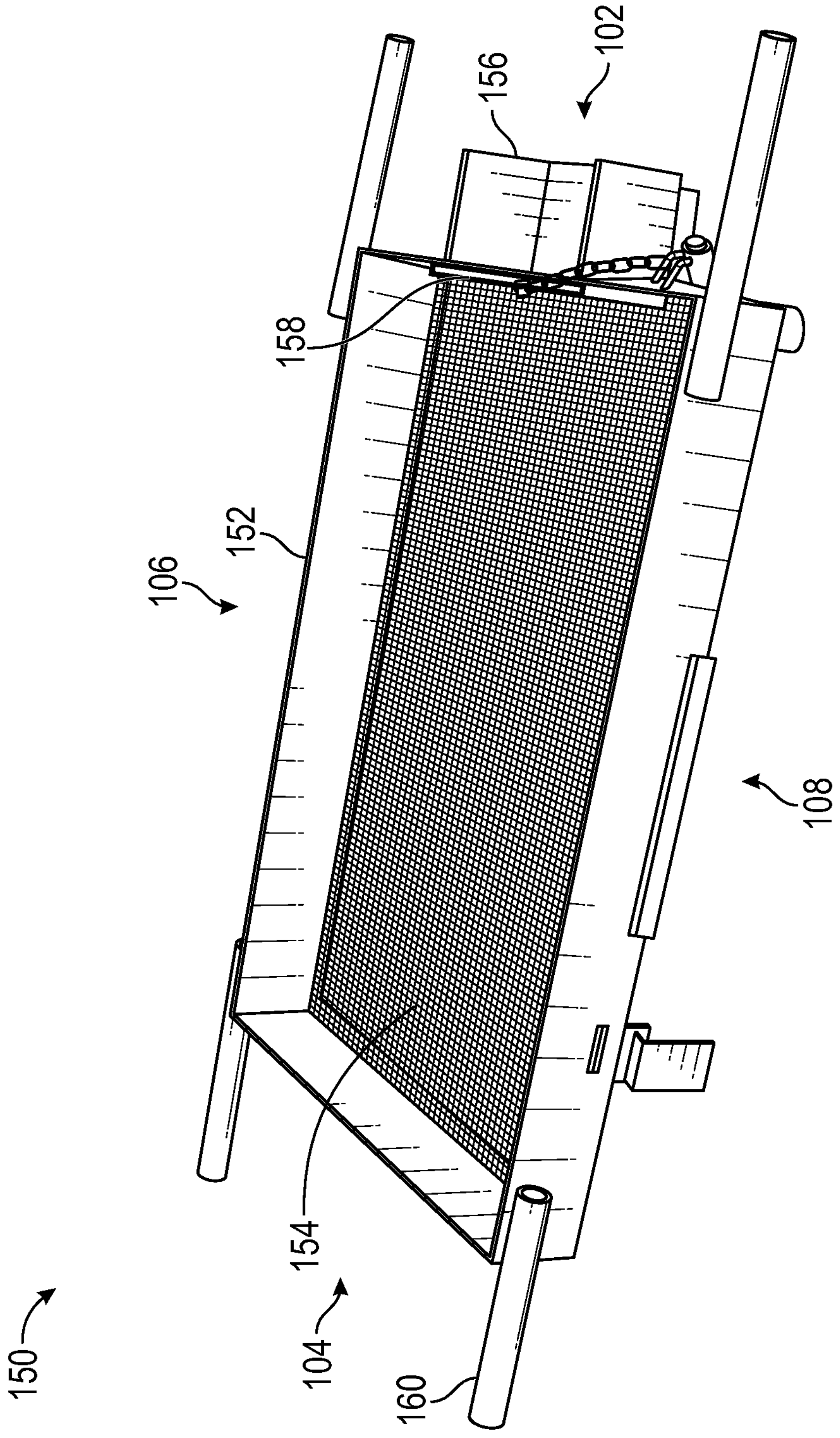
FIG. 1D is a perspective view of the grader tray assembly of the portable particulate grader according to one or more embodiments.

FIG. 1D is a perspective view of the tray assembly 150 included in the grader 100. The tray assembly 150 has a first side 102, a second side 104, a third side 106 and a fourth side 108, which correspond to respective sides of the body assembly 110 when the tray assembly 150 is placed on the body assembly 110 as intended to be placed (i.e, the tray assembly 150 placed such that the side with the upper chute 156 is lower than the side without the upper chute 156). The tray assembly 150 includes a grader tray frame ("tray frame") 152, a detachable mesh ("mesh") 154 disposed on the tray frame 152, an upper chute 156 provided on the first side 102 of the tray assembly 150, and a residual material control gate ("residual control gate") 158 located between the mesh 154 and the upper chute 156. The tray assembly 150 is configured to be detachable from the body assembly 110. The upper housing 112, lower chute 114 and tray assembly 150 are configured to provide an enclosed space such that the emission of the filtered material to the outside of the grader 100 is prevented or reduced. Such prevention of filtered material emission reduces or eliminates worker exposure to the filtered material, improving the safety of the work environment. The tray assembly 150 may include handles 160 disposed on the tray frame 152.

Input Material

An input material to be graded by the grader 100 is generally in a form of particulates or powders. The particles of the input material may have various shapes. Examples of the input material shape include, but are not limited to, sphere, ovoid, cylinder, cuboid, prism, pyramid, random shape, or combinations thereof. A filtered material refers to a portion of the input material that passes through the mesh 154 upon grading/filtering of the input material, and a residual material refers to a portion of the input material that does not pass through the mesh 154. Any material in a form of particulates or powders may be graded with the grader 100. In one or more embodiments, the input material includes a catalyst, a desiccant, an activated carbon, a multimedia filter material, ceramic balls, industrial chemicals, absorbents in granular forms, air dryers, silica particles and combinations thereof.

Grader Body Assembly

In one or more embodiments, the grader 100 includes a body assembly 110. The body assembly 110 includes an upper housing 112 which includes side portions 112*a*. The side portions 112*a* may be a vertical plate or substantially vertical plate located at the first side 102, second side 104, third side 106 and fourth side 108. A "vertical plate" refers to a plate oriented at 90 degrees (°) with respect to a horizontal plane. A "substantially vertical plate" refers to a plate oriented at an angle in a range of from about 70° to about 1100 with respect to the horizontal plane, such as in a range of from a lower limit selected from any one of 70°, 75°, 80°, 85°, 86°, 87°, 88°, 89° to an upper limit selected from any one of 91°, 92°, 93°, 94°, 95°, 100°, 105° and 110°, where any lower limit may be paired with any upper limit. The side portions 112*a* may be fastened or welded to each other by a suitable method available in the art to eliminate any gaps between the side portions 112*a*.

The side portions 112*a* of the upper housing 112 may include an upper edge 112*b* and a lower edge 112*c*. A space defined by the plates of the side portions 112*a*, a plane defined by the upper edge 112*b* of the side portions 112*a*, and a plane defined by the lower edge 112*c* of the side portions 112*a* is referred to an inner portion of the upper housing 112.

In one or more embodiments, the third side 106 and fourth side 108 of the side portions 112*a* of the upper housing 112 have an upper edge 112*b* in the same descending angle, or substantially the same descending angle, toward the first side 102, as the descending angle of the tray assembly 150 that is placed on the body assembly 110. An upper edge 112*b* having a "substantially the same descending angle" as the descending angle of the tray assembly 150 means that the descending angle of the upper edge 112*b* is within 5° of the descending angle of the tray assembly 150, such as within an angle in a range of about 0.1° to about 5°, or in a range having a lower limit selected from any one of 0.10, 0.2°, 0.3°, 0.4°, 0.5° and 1, to an upper limit selected from any one of 3°, 4°, and 5°, where any lower limit may be paired with any upper limit. Such configuration may minimize or eliminate the gap between the upper housing 112 and the tray assembly 150, reducing or eliminating filtered material emission from the grader 100.

The upper housing 112 may be made of suitable materials used in the art, and may include, for example, metals, composites, wood and polymers. The side portions 112*a* of the upper housing 112 may be made of a metallic material and may include a non-metallic protection layer on the surface of the side portions 112*a* that is facing the inner portion of the upper housing to prevent the reaction of the metallic material with the input material being graded. The non-metallic protection layer may include a polymeric protection layer, such as a polyolefin layer, epoxy layer, polyurethane layer or combinations thereof. An exemplary polymeric protection layer may include an epoxy mastic with polyurethane topcoat layer.

The upper housing 112 may further include reinforcement beams 124 in various locations within the inner portion of the upper housing 112, external portion of the upper housing 112, or combinations thereof. The upper housing 112 may include the reinforcement beams 124 in parallel with the lower edge 112*c* of the side portions 112*a*, as shown in FIG. 1C.

In one or more embodiments, a plurality of springs ("springs") 122 is disposed on an inner portion of the upper housing 112 included in the body assembly 110. The springs 122 are configured to hold a tray assembly 150 in a descending angle toward the first side 102.

The descending angle of the tray assembly 150 toward the first side 102 may be in a range of from about 5° to about 450 from the horizontal plane, such as in a range of from a lower limit selected from any one of 5°, 10°, 15°, 20°, 25°, 28° and 300 to an upper limit selected from any one of 20°, 25°, 30°, 35°, 400 and 45°, where any lower limit may be paired with any mathematically compatible upper limit. In one or more embodiments, the descending angle of the tray assembly 150 is in a range of from about 280 to about 45°, which provides sufficient slope to overcome the friction between the particles of the input material and provides free flow of the input material. In one or more embodiments, the descending angle is 30°.

The springs 122 are configured to provide vibrations to the tray assembly 150 by oscillatory movement provided to the grader 100. Because the tray assembly 150 is held by the springs 122, the oscillatory movement provided to the grader 100 vibrates the tray assembly 150 and filters the input material placed on the mesh 154 in an efficient manner. The vibrations, or oscillatory movement may be provided non-electrically. For example, the oscillatory movement may be provided manually by an operator, or by using a pneumatic or mechanically-operated vibration device.

The springs 122 may be directly mounted onto the upper housing 112, such as the side portions 112*a* of the upper housing 112, or may be mounted onto a support, such as a rod, which is located on the reinforcement beams 124 disposed on the upper housing 112, as shown in FIG. 1C. The springs 122 may be mounted with a method and material known in the art, such as welding, fasteners such as bolts and nuts, and adhesives, for example. The springs 122 may be made of suitable materials used in the art, and may include, for example, alloy steel, carbon steel, stainless steel, copper alloys, nickel alloys, titanium and cobalt-nickel. The springs 122 may be made of an alloy of iron and carbon including about 0.7 to about 0.8 wt % of carbon, about 0.5 to about 0.8 wt % of manganese, about 0.03 wt % or less of phosphorus, about 0.035 wt % or less of sulfur, and balance of iron. The number of springs 122 may be adjusted appropriately based on the requirements of each operation. In one or more embodiments, the body assembly 110 includes four springs 122. The body assembly 110 may include more than four springs 122 depending on the size of the grader 100.

In one or more embodiments, the body assembly 110 includes a lower chute 114 including a bottom portion 114*a* and side portions 114*b*. The lower chute 114 is located immediately below the upper housing 112 such that the lower chute 114 and the upper housing 112 provide a continuous structure together. The lower chute 114 includes side portions 114*b* at the first side 102, the second side 104, the third side 106 and the fourth side 108. The side portions 114*b* of the lower chute 114 may adjoin with the side portions 112*a* of the upper housing 112, and the side portions 114*b* and the side portions 112*a* may be bonded together to eliminate or minimize the gap between the lower chute 114 and the upper housing 112.

The lower chute 114 may be made of suitable materials used in the art, and may include, for example, metals, composites, wood and polymers. The lower chute 114 may be made of a metallic material and may include a non-metallic protection layer on the surface of the lower chute 114 that is facing inside to prevent the reaction of the metallic material with the input material being graded. The non-metallic protection layer may include a polymeric protection layer, such as polyolefin layer, epoxy layer, polyurethane layer or combinations thereof. An exemplary polymeric protection layer may include an epoxy mastic with polyurethane topcoat layer.

In one or more embodiments, each side of the side portions 114*b* and the side portions 112*a* is manufactured from a single, continuous sheet such that no bonding is necessary between each side of the side portions 114*b* and the side portions 112*a*. Furthermore, the entirety of the side portions 114*b* and the side portions 112*a* may be produced from a single, continuous sheet. The entirety of the side portions 114*b* and the side portions 112*a* may be produced by cutting the sheet to appropriate shape and bending the sheet to provide all sides of the side portions 114*b* and side portions 112*a*, or may be formed as a single structure with a process such as injection molding.

In one or more embodiments, the bottom portion 114*a* of the lower chute 114 has a descending angle toward a second side 104. Such configuration allows the filtered material to be transferred toward the second side 104 by gravity for easy retrieval of the filtered material. A grader 100 having a bottom portion 114*a* of the lower chute 114 with a descending angle toward the second side 104, and a tray assembly 150 with a descending angle toward the first side 102 allows simultaneous retrieval of the filtered material and residual materials without the risk of unintentionally mixing the filtered and residual materials. Such configuration also allows placement of collection vessels for the filtered and residual materials without interference. In one or more embodiments, the descending angle of the bottom portion 114*a* is in a range of from about 5° to about 60°, such as in a range of from a lower limit selected from any one of 5°, 10°, 15°, 20° 30°, and 35°, to an upper limit selected from any one of 35°, 40°, 45°, 50°, 55°, and 60° where any lower limit may be paired with any mathematically compatible upper limit. In one or more embodiments, the descending angle of the bottom portion 114*a* is in a range of about 35° to about 45°, which provides sufficient slope to overcome the friction between the particles of the filtered material and provides free flow of the filtered material. In one or more embodiments, the descending angle of the bottom portion 114*a* is 40°.

In one or more embodiments, the body assembly 110 includes a dust control gate 120. The dust control gate 120 may be provided on the second side 104 of the side portions 114*b* of the lower chute 114. The dust control gate 120 may include a hinge and may be configured to open outwardly. The hinge may be located at any side of the dust control gate 120, such as at the top side of the dust control gate 120. The dust control gate 120 may have a single-door configuration, or a multi-door configuration, such as a two-door configuration. The dust control gate 120 may also have a sliding-door configuration, and may be configured to slide in any directions including sliding upward.

The dust control gate 120 may be made of suitable materials used in the art, and may include, for example, metals, composites, wood and polymers. The dust control gate 120 may be made of a metallic material and may include a non-metallic protection layer on the surface of the dust control gate 120 that is facing inside to prevent the reaction of the metallic material with the input material being graded. The non-metallic protection layer may include a polymeric protection layer, such as polyolefin layer, epoxy layer, polyurethane layer or combinations thereof. An exemplary polymeric protection layer may include an epoxy mastic with polyurethane topcoat layer.

In one or more embodiments, the body assembly 110 includes wheels 118 disposed on the body assembly 110, such that the grader 100 is made portable and may be easily transported to various locations. The wheels 118 may be directly disposed on the bottom portion of the lower chute 114, or may be disposed on a support 116, such as legs, as shown in FIGS. 1A-C, which are disposed on the body assembly 110.

Grader Tray Assembly

In one or more embodiments, the grader 100 includes a tray assembly 150. The tray assembly 150 includes a grader tray frame ("tray frame") 152, and a detachable mesh ("mesh") 154 disposed on the tray frame 152 to filter an input material. The springs 122 are configured to hold a tray assembly 150 in a descending angle toward a first side 102. The tray assembly 150 is held by the springs 122 of the body assembly 110 such that the descending angle toward the first side 102 may be in a range of from about 5° to about 450 from the horizontal plane, such as in a range of from a lower limit selected from any one of 5°, 10°, 15°, 20°, 25°, 28° and 300 to an upper limit selected from any one of 20°, 25°, 30°, 35°, 400 and 45°, where any lower limit may be paired with any mathematically compatible upper limit. In one or more embodiments, the descending angle of the tray assembly 150 is in a range of from about 280 to about 45°. In one or more embodiments, the descending angle of the tray assembly 150 is 30°. A tray assembly 150 having a descending angle in the above range allows proper flow of the residual material toward the upper chute 156.

The tray frame 152 is designed to allow secure placement of the tray assembly 150 on the springs 122. The tray frame 152 is also designed to hold the mesh 154 without obstruction and in a gap-free manner to prevent any input material to pass through unfiltered. Handles 160 (as shown in FIG. 1D) may be disposed on the tray frame 152 for ease of attaching and detaching the tray assembly 150 to the body assembly 110.

The mesh 154 separates the input material into a filtered material and a residual material based on the particle size. The mesh 154 may have a mesh size (size of each opening) in a range of about 0.0625 inches (1.59 mm) to about 1 inches (25.4 mm). However, the mesh size may be smaller or larger than the aforementioned range depending on the requirement of each application. In one or more embodiments, the mesh size is in a range from a lower limit selected from any one of 0.0625, 0.075, 0.1 and 0.125 inches to an upper limit selected from any one of 0.5, 0.75 and 1 inches, where any lower limit may be paired with any upper limit. In one or more embodiments, the mesh size is 0.0625, 0.125, 0.25, 0.5, 0.75 or 1 inches. The shape of the mesh opening may include any shapes available in the art. Examples of the mesh opening shape may include, but are not limited to, circular, triangular, quadrangular, oval, hexagonal, random-shape and combinations thereof. The mesh 154 may be made of any suitable material known in the art, and may include metals, composites, polymers, ceramics, artificial fibers, natural fibers, and combinations thereof.

The tray assembly 150 further includes an upper chute 156 located on a first side 102 of the tray assembly 150. The upper chute 156 may be disposed on the tray frame 152 such that the residual material may be transferred from the mesh 154 to the upper chute 156 and retrieved. The retrieval of the residual material may be conducted by placing a container or a bag at the end of the upper chute 156. The upper chute 156 may have any shape provided that the upper chute 156 allows the transfer of the residual material and retrieval. In one or more embodiments, the upper chute 156 is a conduit, a channel, or a tube.

The tray assembly 150 further includes a residual control gate 158 located between the mesh 154 and the upper chute 156. The residual control gate 158 may be located where the upper chute 156 abuts the tray frame 152, as shown in FIG. 1D. The residual control gate 158 is provided to allow the inspection of the residual material prior to the retrieval such that the quality of the residual material, including the particle size and size distribution of the residual material, can be properly assessed prior to the retrieval and collection. The residual control gate 158 may include a hinge and may be configured to open outwardly. The hinge may be located at any side of the residual control gate 158, such as at the bottom side of the residual control gate 158. The residual control gate 158 may be at its closed position while the input material is being graded, and may be transitioned to the open position by the weight of the residual control gate 158. The residual control gate 158 may have a single-door configuration, or a multi-door configuration, such as a two-door configuration. The residual control gate 158 may also have a sliding-door configuration, and may be configured to slide in any directions including sliding sideways.

The dimensions of the grader 100 and all components may be appropriately determined based on the requirements of each application.

In one or more embodiments, the grader 100 does not include an electrically-operated component. A grader 100 free of an electrically-operated component does not produce electrical sparks, which may act as an ignition source to cause fire and/or explosion with a presence of flammable and/or explosive materials. Such a grader is suitable for use in a hazardous environment, such as in areas with the presence of hydrocarbon vapor, or airborne solvent, for example. As previously described, an oscillatory movement that provides vibrations to the tray assembly 150 may be provided manually, or by the use of pneumatic or mechanical vibration device.

Method for Grading Particulates

In one aspect, embodiments disclosed herein relate to a method for grading particulates. The method may be conducted using the portable particulate grader 100 as previously described.

In one or more embodiments, the method includes introducing an input material to the detachable mesh 154 of the grader 100, providing vibrations non-electrically to the grader 100 to separate the input material into a filtered material and a residual material. The provided vibrations transfer the filtered material into the lower chute 114 and transfer the residual material toward the first side 102 of the grader tray assembly 150. The method further includes opening the dust control gate 120 to retrieve the filtered material from the lower chute 114, and opening the residual control gate 158 of the tray assembly 150 to transfer the residual material to the upper chute 156 of the tray assembly 150.

In one or more embodiments, the introduction step of the input material to the mesh 154 is conducted by dispensing the input material onto the mesh 154. The input material may be dispensed from, for example, a container or a bag, or from a hopper or a vessel.

In one or more embodiments, the provision of vibrations may be conducted non-electrically, such as providing oscillatory movement manually to the grader 100 or by using pneumatic or mechanical vibration device, to separate the input material to the filtered material and the residual material. Non-electrical provision of vibrations allows the method to be conducted safely in a hazardous environment, such as in an environment where flammable materials are present, because such method does not generate electrical sparks.

The vibrations cause the input material particles having an equal size as the mesh size or smaller than the mesh size of the mesh 154 transfer to the lower chute 114, while the particles larger than the mesh size remain on the mesh 154. Due to the vibrations and angled configurations of the tray assembly 150 and the bottom portion 114*a* of the lower chute 114 as previously described, the filtered material may further transfer toward the second side 104 of the lower chute 114, and the residual material may further transfer toward the first side 102 of the tray assembly 150. The vibration may be provided for a duration in a range of from about 3 minutes to 5 minutes per batch of input material. The duration may be longer or shorter depending on the size of the batch or the grader 100.

In one or more embodiments, the opening step of the dust control gate 120 is conducted to retrieve the filtered material. The filtered material may be placed in a container or a bag for storage or for the use in a downstream operation.

In one or more embodiments, the opening of the residual control gate 158 is conducted to allow the residual material to be transferred to the upper chute 156. The residual material in the upper chute 156 is then retrieved for storage or for the use in a downstream operation. The residual material may be retrieved into a container or a bag directly attached to the upper chute 156, such that the residual material flows into the container or a bag without additional assistance when the residual control gate 158 is opened. Such configuration allows the transfer of the residual material into the container or bag without additional contact to the material, minimizing contamination and possible health and safety hazard. The presence of the residual control gate 158 allows the residual material to remain on the mesh 154 such that the residual material may be inspected for its quality, such as particle sizes and particle size distribution, prior to opening the residual control gate 158 and transfer of the residual material to the upper chute 156.

The retrieval of the filtered material from the lower chute 114, transfer of the residual material to the upper chute 156 and retrieval of the residual material from the upper chute 156 may be conducted separately or simultaneously. The angled configuration of the tray assembly 150 and the bottom portion 114*a* of the lower chute 114 (tray assembly 150 having a descending angle toward the first side 102 and the bottom portion 114*a* of the lower chute 114 having a descending angle toward the second side 104) allows the simultaneous retrieval of the filtered material and residual material.

The grader 100 of the present disclosure is portable, which may allow quick deployment in remote locations. The grader 100 is also designed to eliminate or minimize the emission of graded material, and is free of electric sparks and safe to use in an environment where flammable or explosive materials may be present. As a result, the grader may be suitable for use in various industries such as oil and gas industry, chemical industry, construction, water injection facilities and food industry. The grader may be suitable for separation of catalysts, sand and gravel, and multimedia separation. The grader requires minimal operator training, and the replacement of the mesh can be conducted quickly, which reduces down time. The grader does not require extensive maintenance and can be produced from commonly-available materials.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke means-plus-function for any limitations of any of the claims herein, except for those in which the claim expressly uses the words 'means for' together with an associated function.

What is claimed is:

1. A portable particulate grader, comprising:
a grader body assembly comprising:
an upper housing comprising side portions;
a plurality of springs disposed on an inner portion of the upper housing and configured to hold a grader tray assembly in a descending angle toward a first side in a range of from 5 to 45 degrees, and provide vibrations to the grader tray assembly;
a lower chute comprising a bottom portion and side portions, and located immediately below the upper housing;
a dust control gate provided on a second side of the side portions of the lower chute; and
wheels disposed on the grader body assembly; and
the grader tray assembly comprising:
a grader tray frame;
a detachable mesh disposed on the grader tray frame to filter an input material;
an upper chute located on a first side of the grader tray assembly; and
a residual control gate located between the detachable mesh and the upper chute,
wherein:
the grader tray assembly is configured to be detachable from the grader body assembly,
the upper housing, the lower chute and the grader tray assembly are configured to provide an enclosed space to prevent emission of a filtered material, and
the portable particulate grader does not comprise an electrically-operated component.

2. The portable particulate grader of claim 1, wherein the bottom portion of the lower chute has a descending angle toward a second side in a range of from 5 to 60 degrees.

3. The portable particulate grader of claim 1, wherein the detachable mesh has a mesh size in a range of from 0.0625 to 1 inches.

4. The portable particulate grader of claim 1, wherein the plurality of the springs comprises four springs.

5. The portable particulate grader of claim 1, wherein a third side and a fourth side of the side portions of the upper housing has an upper edge having a substantially the same descending angle toward the first side as the descending angle of the grader tray assembly.

6. The portable particulate grader of claim 1, wherein the input material is selected from the group consisting of a catalyst, a desiccant, an activated carbon, a multimedia filter material, ceramic balls, industrial chemicals, absorbents in granular forms, air dryers, and silica particles.

7. The portable particulate grader of claim 1, wherein the side portions of the upper housing are made of a metallic material and comprise a non-metallic protection layer on a surface of the side portions that is facing the inner portion of the upper housing.

8. The portable particulate grader of claim 1, wherein the plurality of the springs are configured to hold the grader tray assembly in the descending angle toward the first side in a range of from 28 to 45 degrees.

9. A method for grading particulates, comprising:
introducing the input material to the detachable mesh of the portable particulate grader of claim 1;
providing vibrations non-electrically to the portable particulate grader to separate the input material into the filtered material and a residual material,
wherein the vibrations transfer the filtered material into the lower chute and transfer the residual material toward the first side of the grader tray assembly,
opening the dust control gate to retrieve the filtered material from the lower chute, and
opening the residual control gate to transfer the residual material to the upper chute.

10. The method of claim 9, wherein the input material is selected from the group consisting of a catalyst, a desiccant, an activated carbon, a multimedia filter material, and ceramic balls.

11. The method of claim 9, wherein the providing of the vibration is conducted by manually providing an oscillatory movement to the portable particulate grader.

12. The method of claim 9, wherein the providing of the vibration is conducted for a duration in a range of from 3 minutes to 5 minutes.

13. The method of claim 9, further comprising inspecting the residual material prior to opening the residual control gate.

14. The method of claim 9, further comprising retrieving the residual material from the upper chute.

15. The method of claim 14, wherein the retrieval of the filtered material from the lower chute and the retrieval of the residual material from the upper chute is conducted simultaneously.

16. The method of claim 14, wherein the retrieving of the residual material is conducted by:

directly attaching a container or a bag to the upper chute before the opening of the residual control gate; and allowing the residual material to flow into the container or the bag without an assistance upon opening of the residual control gate.

* * * * *